(12) United States Patent
Cooper

(10) Patent No.: US 8,152,432 B2
(45) Date of Patent: Apr. 10, 2012

(54) CONTAINER UNLOADING DEVICE

(76) Inventor: Kylan Cooper, Marsing, ID (US)

( * ) Notice: Subject to any disclaimer, the term of this patent is extended or adjusted under 35 U.S.C. 154(b) by 919 days.

(21) Appl. No.: 12/167,969

(22) Filed: Jul. 3, 2008

(65) Prior Publication Data

US 2009/0191036 A1 Jul. 30, 2009

Related U.S. Application Data

(60) Provisional application No. 61/023,456, filed on Jan. 25, 2008.

(51) Int. Cl.
*B65G 65/23* (2006.01)
(52) U.S. Cl. ...................................................... 414/425
(58) Field of Classification Search .............. 414/471, 414/498, 678, 754, 425, 391
See application file for complete search history.

(56) References Cited

U.S. PATENT DOCUMENTS

| | | | |
|---|---|---|---|
| 3,207,346 A | | 9/1965 | Beutler et al. |
| 3,764,029 A | * | 10/1973 | Riley ............................ 414/572 |
| 3,770,309 A | | 11/1973 | Merchant et al. |
| 3,902,616 A | * | 9/1975 | Santic et al. .................. 414/420 |
| 4,095,708 A | * | 6/1978 | Gerhard ........................ 414/420 |
| 4,293,077 A | | 10/1981 | Makino |
| 4,431,359 A | | 2/1984 | Toniolo |
| 4,573,850 A | | 3/1986 | Suarez |
| 4,645,405 A | | 2/1987 | Cambiano |
| 4,715,762 A | | 12/1987 | Lanigan, Sr. et al. |
| 4,840,532 A | | 6/1989 | Galbreath |
| 4,963,070 A | | 10/1990 | Detrick |
| 5,147,170 A | | 9/1992 | Detrick |
| 5,370,435 A | | 12/1994 | Monk et al. |
| 5,551,831 A | | 9/1996 | Corbett |
| 6,077,028 A | | 6/2000 | Hassenplug, Jr. et al. |
| 6,273,667 B2 | | 8/2001 | Karpisek |
| 6,802,686 B1 | | 10/2004 | Hastings |
| 6,913,431 B2 | | 7/2005 | Lilley |
| 6,931,314 B2 | | 8/2005 | Holland et al. |
| 6,966,741 B2 | * | 11/2005 | Gay et al. ...................... 414/662 |
| 7,104,425 B2 | * | 9/2006 | Le Roy ........................ 222/185.1 |
| 2001/0001032 A1 | | 5/2001 | Karpisek |
| 2005/0281652 A1 | | 12/2005 | Riley et al. |

* cited by examiner

*Primary Examiner* — Charles A Fox
(74) *Attorney, Agent, or Firm* — Robert L. Shaver; Dykas & Shaver, LLP

(57) ABSTRACT

Presented is a device for lifting land/sea containers off of a trailer chassis and for tipping them into a vertical position for loading. The device includes a door opening assembly for opening and closing the doors, including when the container is in a vertical position. When the container is filled, the doors would be closed and the container would be lowered to a horizontal position. From the horizontal position, the device is configured to place the container on the chassis of a trailer for towing by a truck.

13 Claims, 6 Drawing Sheets

CONTAINER UNLOADING DEVICE

CROSS-REFERENCE TO RELATED APPLICATIONS

This application claims the priority date of the provisional application entitled CONTAINER UNLOADING DEVICE filed by Kylan Cooper on 25 Jan. 2008 with application Ser. No. 61/023,456.

FIELD OF THE INVENTION

The invention generally relates to a device for use in holding and loading containers, and more particularly to a device for placing a land/sea container on end for loading, and then lowering it to horizontal for mounting on a trailer chassis.

BACKGROUND OF THE INVENTION

Land/sea containers are a standardized type of container in which all kinds of goods and materials are shipped. The land/sea container can be of various lengths, but at present the standard width is 8 feet. Land/sea containers are transported on land on rail car flat beds and on trailers pulled by tractor rigs. The containers are off-loaded from the trailers for use at destination facilities, or for loading onto a sea going vessel.

Land/sea containers are loaded by opening the doors which are on one end of the trailer and placing goods inside the trailer. This can be by forklift or other means. Often palates of goods are driven into the container by forklift, or the container may be loaded by other methods.

One disadvantage in loading containers is if the material to be loaded is not palletized but is a bulk or free-flowing item. This could include solid materials such as scrap iron, and it could also be encountered when dealing with free-flowing materials such as grains, powders, particulates, or other free-flowing devices. A container could also be designed to hold liquids, and obviously filling the container with liquid while the container is in horizontal position would be impossible. However, if a liquid proof container with sealable doors were made, it could be filled if the container were tipped on end.

In each of the above situations, the container is better filled when the container is tipped on end. This is difficult to do because the container is very heavy. It is also complicated by the fact that it must be lifted off a trailer, and then lifted to a vertical position.

SUMMARY OF THE INVENTION

The device of the invention is a loading device for land/sea shipping containers of the type which are mounted on trailer chassis and transported by trucks, and also unloaded from trucks onto ships for transoceanic shipment. This type of land/sea shipping container can be various lengths from 20 feet to 40 feet or greater, and are made to standard dimensions and attachment specifications.

The invention of the device includes a loader frame which is configured to attach to the shipping container and to lift it off a trailer chassis. In order to accomplish this, a truck with a shipping container backs into the center of the loader frame, whereupon the loader frame is attached at the four corners of the shipping container. Attached to the loader frame is a container lifting bracket which is configured for rotation in relation to the loader frame. The container lifting bracket includes a plurality of attachment points for attaching the lifting bracket to the shipping container.

The device also includes a plurality of loader frame legs which are configured to lift the loader frame, and the container lifting bracket with the container attached. The purpose of the loader frame legs is to lift the container off the trailer chassis, and when the reverse operation is being performed, to lower the shipping container onto the trailer chassis. The device also includes at least one tilting arm for rotating the container lifting bracket from a horizontal to a vertical position in relation to the loader frame, which always stays in a horizontal position. The tilting arm also causes rotation of the container lifting bracket from a vertical to a horizontal position, from which position the container may be re-loaded onto a trailer chassis.

The loading device is configured to interface with a conventional truck and trailer chassis combination, with a container mounted to the trailer chassis in the orientation in which such containers are typically transported. That is, with the container doors oriented toward the rear of the trailer chassis. The device of the invention thus connects to the shipping container, lifts it off the trailer chassis, and tilts it into a vertical orientation in such a manner that the container doors are on the upper end of the trailer when it is vertical.

The device preferably includes four loader frame legs which are positioned near the four corners of the generally rectangular loader frame. These loader frame legs are configured to lift the loader frame with the attached container off of the trailer chassis.

The device can also include one or more wheel guides for guiding the trailer chassis wheels into position for engagement of the lifting bracket to the container. The wheel guides are one or more tracks or sloping sidewalls which help the truck driver back the truck into position for engagement by guiding the wheels of the truck.

The device can also include a container door opening and closing arm. This is a device which is attached to the container lifting bracket, and which would serve to hold the container door as the container is being lifted towards the vertical, and would allow the operator the ability to open the container door when the container had reached a vertical position and to close the door.

The device can include a pair of hydraulic cylinders mounted on the left and right side of the loader frame, for rotating the lifting bracket from a horizontal to a vertical position, and lowering it back down to a horizontal position. Each of the hydraulic cylinders would be attached to the loader frame at one end, and at a second end, would be attached to the lifting bracket.

The device can also include a base support plate which is configured to contact and support the end of the container which is towards the front of the truck chassis. As the container is lifted to a vertical position, the base support plate would press against the rear or bottom end of the shipping container to provide support for that end of the container. In this way, the end wall of the container is supported. When the container is in the vertical position, material which is dropped into the container would not damage or burst the end of the container which is on the bottom when the container is in a vertical position. The base support plate can be a fixed plate on which the container end is brought into contact when it is in the vertical position. It can also be a plate which moves into position adjacent or contacting the end wall of the container before or during the transition from horizontal to vertical. The latter configuration of the base support plate would be most useful when lifting a particularly heavy or a loaded container, so that the end wall is not damaged by the weight of the container or the material in the container.

The attachment points on the device are locking pins which engage attachment holes in the container.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out the invention. As will be realized, the invention is capable of modification in various obvious respects, all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
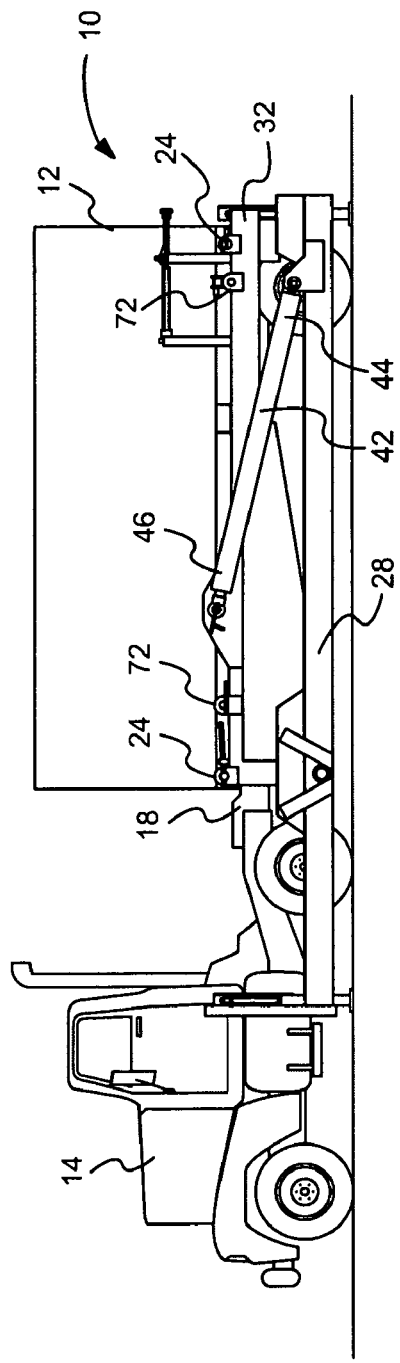
FIG. 1 is a side view of the device of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

FIGS. 1-6 show one preferred embodiment of the invention.

Figure 7:
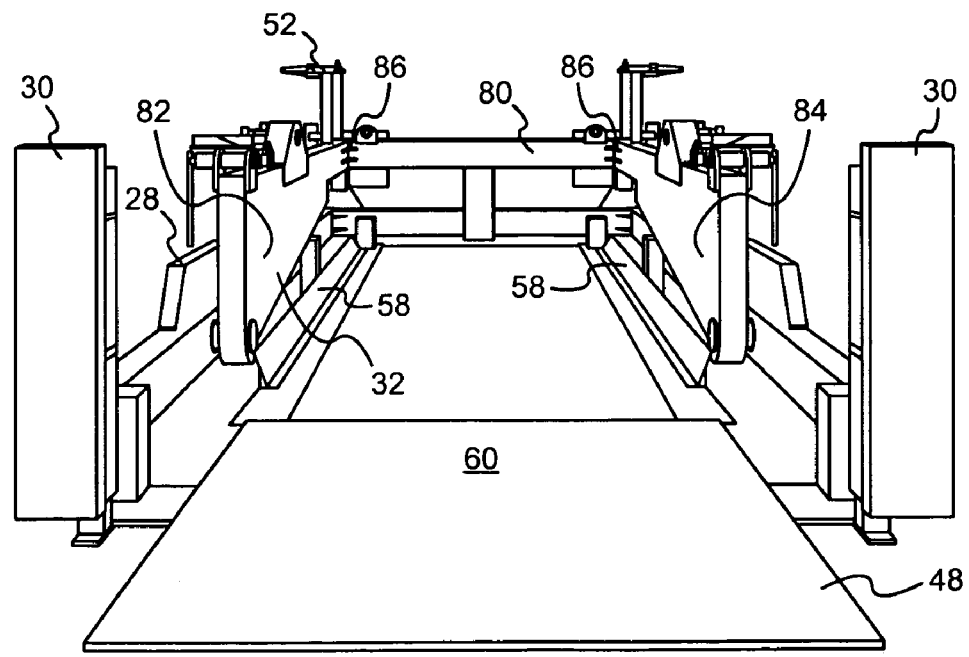
FIG. 7 is a perspective view of the loader frame, the container lifting bracket, and the wheel guides of the invention.

FIG. 1 shows the container loader 10 of the invention in a configuration in which a truck 14 and a cargo container 12 are in position for unloading. Shown in FIG. 1 is the container 12 on a trailer 18, inside the loader frame 28 of the device, and adjacent to the container lifting bracket 32 of the device. A hydraulic cylinder 42 is shown, which is attached at a first end 44 to the loader frame 28, and at a second end 46, to the container lifting bracket 32. The lifting bracket 32 is generally U shaped, with a rear plate 80, a left arm 82, and a right arm 84, with said rear plate 80 joining said left arm 82 and right arm 84 at generally right angles. FIG. 7 shows a view of the rear plate 80, the left arm 82, and the right arm 84 of the lifting bracket.

Figure 2:
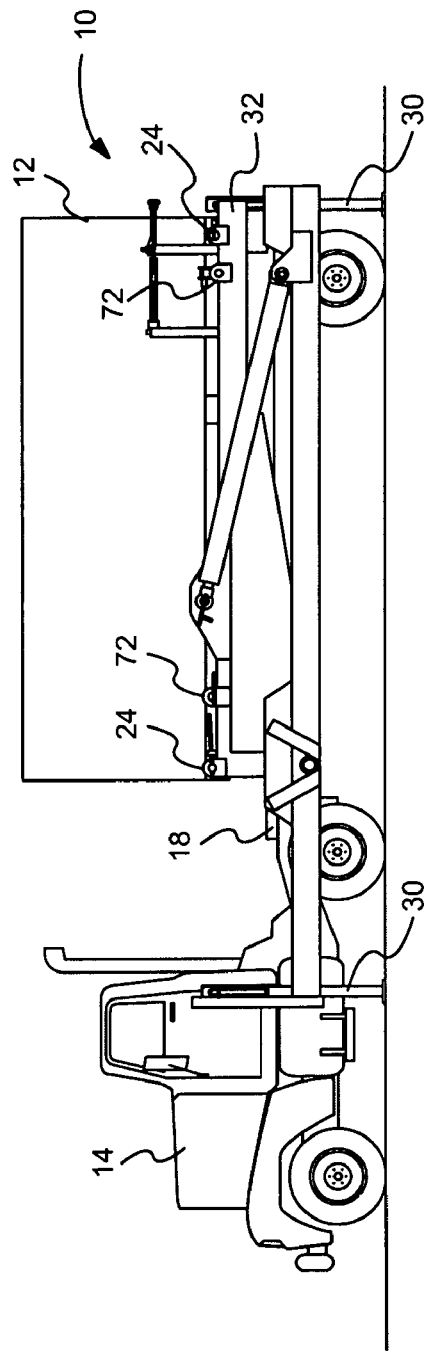
FIG. 2 is a side view of the container loading device showing the container being lifted off the truck chassis.

FIG. 2 shows the truck 14 and trailer 18 in the same position as shown in FIG. 1, but in FIG. 2 the cargo container 12 has been attached to the attachment points of the container lifting bracket 32, and the loader frame legs 30 have been activated to lift the loader frame 28 and the container lifting bracket 32 into the air with the container 12 attached. In the position shown in FIG. 2, the container 12 is no longer attached to the trailer 18, and the truck 14 is free to drive forward, leaving the container 12 attached to the container loader 10 of the invention.

Figure 3:
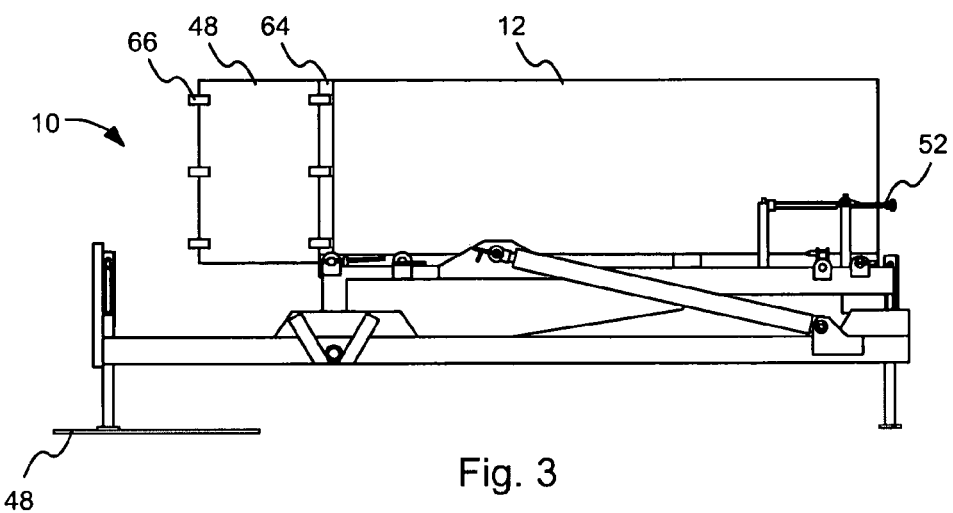
FIG. 3 is a side view of the device of the invention showing the truck and trailer removed from the container.

FIG. 3 shows the container loader 10 of the invention and the cargo container 12 in the same position as shown in FIG. 2, but the truck 14 and the trailer 18 have been withdrawn. Also shown in FIG. 3 is a container door opening and closing arm 52 which will be referred to as the door arm 52. The door arm 52 serves to open and close the doors of the container 12 while the container 12 is in position on the container loader 10. Shown on FIG. 3 is an optional configuration of the base support plate 48. In the configuration shown in FIG. 3, the base support plate 48 is attached in a hinged configuration to a base support plate riser 64. There would be two of these risers on either side of the cargo container 12, and the base support plate 48 in this configuration would be locked into place on the opposite side by one or more base support plate locks 66. In this configuration, the end wall of the container would be supported as it was tipped into a vertical position. This would serve to facilitate a loaded container being tipped on end, so that the weight inside the container would not push out the end wall of the container. FIG. 3 shows an alternate position of the base support plate 48, with the base support plate 48 positioned so that when the container is placed in an upright position, it will contact the base support plate 48 which is placed on the ground below it.

Figure 4:
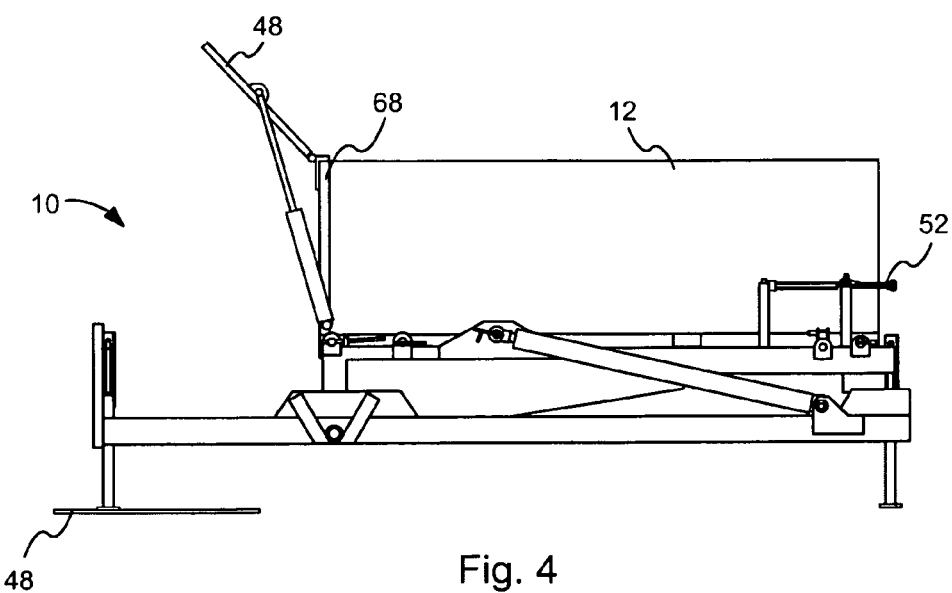
FIG. 4 is a side view of the device of the invention showing a rotatable base support plate.

FIG. 4 shows another configuration of the device in which the base support plate 48 is mounted to a base support plate bracket 68 and is configured to be lowered or raised to support the end wall of the container. As in FIG. 3, this would facilitate the tipping of a full container and support the end wall of the container while it is being moved to a vertical position. The base support plate 48 can also be raised from below the container to a supporting position by the container end.

Figure 5:
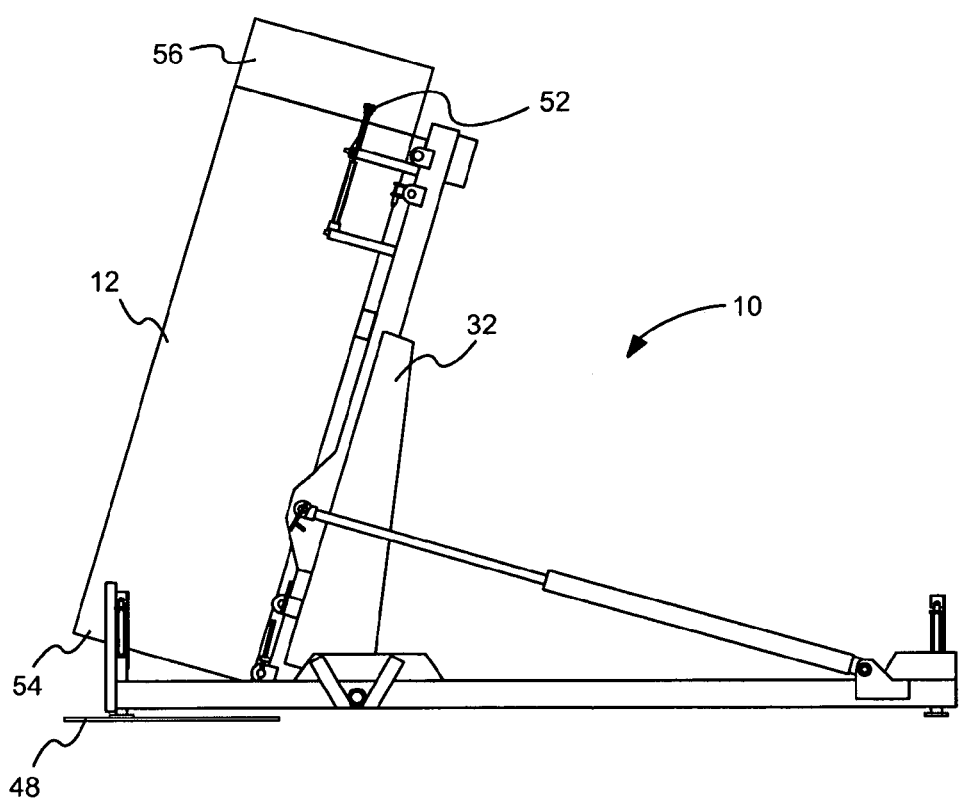
FIG. 5 is a side view of the device showing the container lifting bracket being raised to the vertical position.

FIG. 5 shows the container loader 10 of the invention with the container lifting bracket 32 lifted into an almost horizontal position, with the container 12 attached. Further rotation will result in the container 12 being vertical. Shown in FIG. 4 is a base support plate 48 which is present to support the end wall 54 of the container. This is so that when the container 12 is in a vertical position, material may be dropped from above the container doors 56, which are shown as being open in FIG. 4, and the end wall 54 of the container 12, will not be damaged or blown out by the impact of this material.

Figure 6:
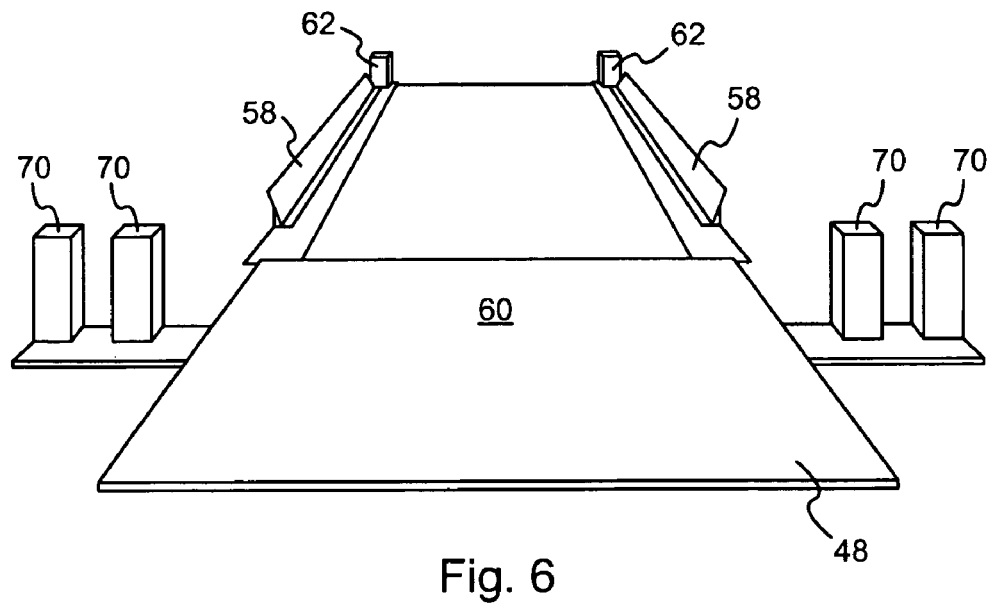
FIG. 6 is a perspective view of the wheel guides of the invention.

FIG. 6 shows a pair of wheel guides 58 which are attached to a base plate 60. Included in the base plate 60 is a base support plate 48 in the form of an apron which extends beyond the end of the base plate 60. In another configuration of the device, the base support plate 48 can be articulated, and can be configured to move into position adjacent the end wall 54 of the container 12 before the container 12 reaches the vertical position. The configuration with the articulated base support plate 48 would be useful when the container is lifted to a vertical position when it is in a loaded or semi-loaded state. The base support plate 48 can be hinged from above the container, or from below the container.

The base plate 60 of the invention includes a pair of rear corner pieces 62 which are provided for orientating the base plate 60 with the loader frame 28 and for supporting the wheel guides 58. The base plate 60 can also contain a pair of frame guides 70 which keep the base plate oriented with the loader frame, and keep the loader frame from expanding toward the sides.

Shown in FIG. 7 is a perspective view of the base plate 60, with wheel guides 58, assembled in conjunction with loader frame 28 and container lifting bracket 32. The base plate 60 can be a separate unit from the loader frame 28 or can be attached. Frame guides 70 serve to stabilize the loader frame, and the loader frame fits between the two pairs of frame guides 70. The device includes a container centering system made up of two parts. One part is seen in FIG. 7 at deflecting wedges 86. These are corner pieces which contact the container and/or the trailer as it is being backed into position, and deflect the container and/or the trailer toward a centered position. In addition to the centering effect of these wedges, the device is provided with I-shaped brackets which have a centering effect.

Figure 9:
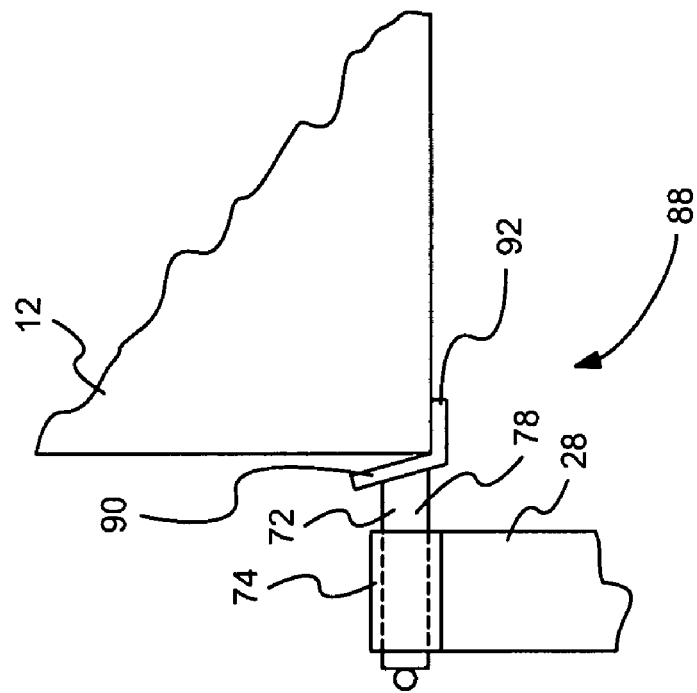
FIG. 9 is a side view of a J shaped bracket of the invention lifting the container.
Figure 8:
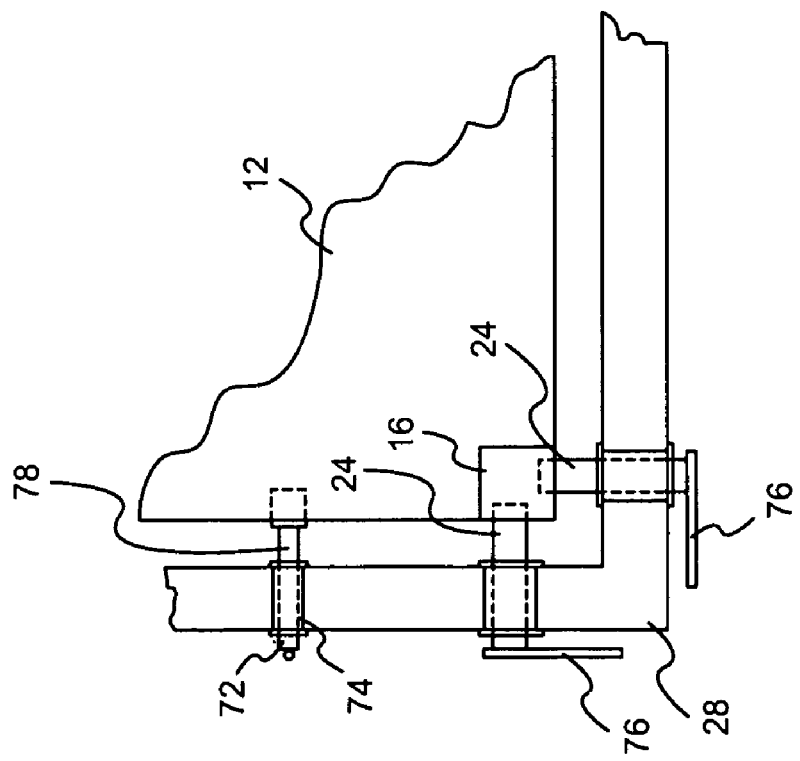
FIG. 8 is a top view of the device of the invention as it attaches to a container.
Figure 10:
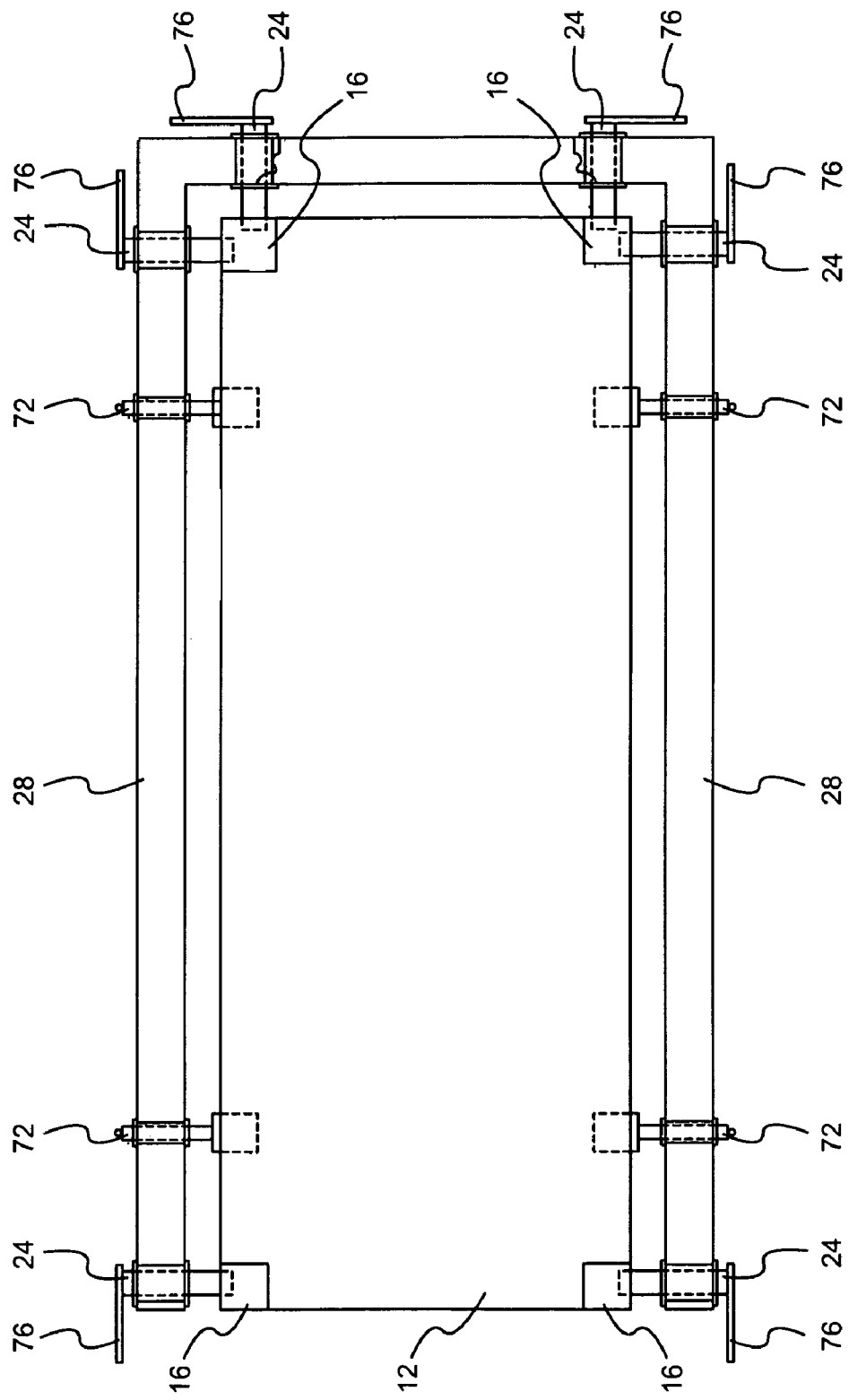
FIG. 10 is a top view of the full container showing lifting brackets and corner pins

Shown in FIGS. 8, 9, and 10 are the corner locking and the lifting mechanisms of the container loader 10.

Shown in FIG. 9 is a J shaped bracket 72, attached to a support bar located within a sleeve 74. The sleeve 74 is attached to the loader frame 28 and the J-shaped bracket 72 extends in and out of the sleeve 74. Also shown in FIG. 9 are two corner pins 24 which are slidably attached to the loader frame 28. These are manually pressed into holes in the corner lock 16 of the container.

FIG. 8 is a side view of a J-shaped bracket 72 as it first engages the container 12. As a truck 14 with the attached cargo container 12 enters the cargo container, the loader frame 28 is moved into a position so that the two J-shaped brackets on each side of the loader frame 28 can be pushed forward so that they fit under the edge of the cargo container 12, as shown in FIG. 8. Once the J-shaped brackets are under the container 12, the loader frame 28 is lifted and the loader frame 28 lifts the container 12 off of the trailer 18. Once the weight of the container is held on the J-shaped brackets 72, the holes in the corner lock 16 of the containers are at the same level as the corner pins 24, and these can be manually slid into place in the corner locks 16 of the container. The J-shaped brackets 72 lock in place under the container with a pin or lever or other conventional locking means. The corner pins 24 also lock in place by turning a handle 76, which locks the head of the corner pins 24 into the oval shaped holes in the corner lock 16 of the containers. If the J-shaped brackets contact the edge of the container on the sloping portion 90 of the J-shaped brackets, the container would slide down the slope of the J-shaped bracket until the container rested on the flat portion 92 of the J-shaped bracket. This structure forms part of the centering system 88 of the device 10, along with the deflecting wedges 86.

FIG. 10 shows the 4 J-shaped brackets in position to lift the container to a level orientation, with four of the corner pins 24 locked into place to prepare to tilt the container 12. When the container is lifted into a vertical position, there is no weight on the J-shaped bracket 72, and the full weight of the container 12 is supported by the corner pins 24. This version of the device shows the corner pins 24 fitting into the four corner locks 16 which are positioned along the bottom edge of the container 12. However, cargo containers are typically configured with identical corner locks on the upper four corners as well. The loader frame 28 of the invention can also include an upper structure which engages and secures the container at the upper corner locks of the container.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A loading device for land-sea shipping containers mounted on trailer chassis on trucks, comprising:
- a loader frame compatible for drive in docking with a conventional truck and trailer chassis combination carrying a container with container doors oriented to the rear of said trailer chassis, said loader frame comprising at least four loader frame legs positioned near four corners of said loader frame, for lifting said loader frame and said container from said trailer chassis;
- a container lifting bracket, rotatably attached to said loader frame, with a plurality of attachment points for attaching said lifting bracket to said shipping container,
- at least one wheel guide for guiding said trailer chassis wheels into position for engagement of said lifting bracket to said container;
- a container door opening and closing arm, for opening and closing said container door when said container is attached to said container lifting bracket;
- a pair of hydraulic cylinders, mounted on a left and a right side of said loader frame, connecting said loader frame and said lifting bracket, with a first end of each of said hydraulic cylinder attached to said loader frame and a second end of each of said hydraulic cylinders attached to said lifting bracket, for rotating said container lifting bracket and an attached container from a horizontal to a vertical position, and back to a horizontal position, with an attached shipping container; and
- a base support plate attached to said loader frame for contacting and supporting a rear end of said shipping container when said shipping container and lifting bracket are in a vertical position, so that material dropped into said container does not damage said rear end of said shipping container;
- wherein said container lifting bracket is attachable to said shipping container with said attachment points, with said loader frame being liftable by said loader for raising said lifting bracket and said container off said truck, and with said lifting bracket rotatable from a horizontal position to a vertical position and back to a horizontal position to facilitate loading and unloading said shipping container, with said loader frame being lowerable to lower said container onto a trailer chassis.

2. A loading device for land-sea shipping containers mounted on a trailer chassis on trucks with rear doors on a back end of said containers, comprising:
- a loader frame providing drive up access to a container on a trailer chassis, and a at least four loader legs attached to corners of said loader frame for lifting said container off said trailer chassis;
- a generally U shaped container lifting bracket, rotatably attached to said loader frame, for attachment to said container, and rotatable in relation to said loader frame, with a plurality of attachment points for attaching said container lifting bracket to said shipping container, said lifting bracket further comprising a rear plate and a left and right arm attached to either end of said rear plate; and at least one tilting arm, for rotating said container lifting bracket from a horizontal to a vertical position, and back to a horizontal position, with an attached shipping container;

wherein said container lifting bracket attaches to said shipping container with said attachment points, with said loader frame legs for lifting said container lifting bracket and said container off said truck, and with said lifting bracket rotatable from a horizontal position to a vertical position and back to a horizontal position to facilitate loading and unloading said shipping container, with said lifting bracket rotatable to tilt said container to a vertical orientation so that said container doors are oriented upward, with said loader frame downwardly movable to lower said container onto a trailer chassis for attachment and removal.

3. The loading device of claim 2 which further comprises one or more wheel guides for guiding said trailer chassis wheels into position for said container to engage with and attach to said lifting bracket.

4. The loading device of claim 2 which further comprises a container door opening and closing arm, for opening and closing said container door when said container is engaged with said lifting bracket.

5. The loading device of claim 2, which further comprises a pair of hydraulic cylinders acting as a tilting arm, mounted on a left and a right side of said loader frame, connecting said loader frame and said lifting bracket, with a first end of each of said hydraulic cylinders attached to said loader frame and a second end of each of said hydraulic cylinders attached to said lifting bracket.

6. The loading device of claim 2, which further includes a base support plate movable to a rear end of said container, for contacting and supporting said a rear end of said shipping container when said container and lifting bracket are in a vertical position, so that material dropped into said container does not damage said rear end of said shipping container.

7. The loading device of claim 2, in which said loader frame legs comprise hydraulic legs for lifting said loader frame for alignment with attachment ports on said containers, and for lifting said attached container off of the truck when said container is attached to said container lifting bracket.

8. The loading device of claim 2, in which said attachment points comprise locking pins which engage attachment holes in said container.

9. The loading device of claim 2 which further includes a Y axis centering system for centering said container relative to said lifting bracket.

10. The loading device of claim 2 in which said Y axis centering system is comprised of a pair of deflecting wedges in said lifting bracket between said left arm and said rear plate of said lifting bracket, and between said right arm and said rear plate, configured for deflecting a container to a centered position relative to said lifting bracket as said container is backed into said loading device.

11. The loading device of claim 2 in which said Y axis centering system is further comprised of a plurality of J shaped brackets configured to lift said container from said trailer, with the J shaped brackets configured to deflect said container in a centering direction if said container contacts a sloping portion of said J shaped bracket when lifting.

12. The loading device of claim 2, in which said device further comprises a plurality of generally J shaped brackets slideably attached to said loader frame, with said J shaped brackets configured to slide under said container for lifting, and to slide away from said container for disengaging.

13. The loading device of claim 2, in which said frame further includes a support bar for supporting said J shaped bracket, with said support bar configured to slide under and away from said container.

* * * * *